United States Patent
John (10) Patent No.: US 7,581,087 B2
(45) Date of Patent: Aug. 25, 2009

(54) METHOD AND APPARATUS FOR DEBUGGING A MULTICORE SYSTEM

(75) Inventor: Johnny Kallacheril John, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 11/360,240

(22) Filed: Feb. 22, 2006

(65) Prior Publication Data

US 2007/0168651 A1 Jul. 19, 2007

Related U.S. Application Data

(60) Provisional application No. 60/759,797, filed on Jan. 17, 2006.

(51) Int. Cl.
*G06F 13/10* (2006.01)
(52) U.S. Cl. .............................. 712/227; 712/12; 710/1; 703/20
(58) Field of Classification Search .................. 703/20, 703/22; 718/104
See application file for complete search history.

(56) References Cited

U.S. PATENT DOCUMENTS

| | | | | |
|---|---|---|---|---|
| 4,821,178 | A * | 4/1989 | Levin et al. | 714/47 |
| 5,365,228 | A * | 11/1994 | Childs et al. | 340/2.21 |
| 6,105,099 | A * | 8/2000 | Freitas et al. | 710/200 |
| 6,233,144 | B1 * | 5/2001 | Lee et al. | 361/686 |
| 6,718,294 | B1 * | 4/2004 | Bortfeld | 703/20 |
| 6,832,326 | B2 * | 12/2004 | Kubo et al. | 713/400 |
| 7,058,948 | B2 * | 6/2006 | Hoyle | 718/104 |
| 7,124,404 | B1 * | 10/2006 | Bebout et al. | 717/127 |
| 7,152,186 | B2 * | 12/2006 | Airaud et al. | 714/30 |
| 2004/0080372 | A1 * | 4/2004 | Chen | 330/311 |
| 2005/0034017 | A1 | 2/2005 | Airaud et al. | |
| 2005/0055594 | A1 * | 3/2005 | Doering et al. | 713/375 |

(Continued)

FOREIGN PATENT DOCUMENTS

WO 2004017204 A2 2/2004

OTHER PUBLICATIONS

Wolf, Computer as Components, 2001, Morgan Kaufmann, pp. 225-226.*

(Continued)

*Primary Examiner*—Henry W. H. Tsai
*Assistant Examiner*—Cheng-Yuan Tseng
(74) *Attorney, Agent, or Firm*—Nicholas J. Pauley; Peter M. Kamarchik (57) ABSTRACT

Techniques for debugging a multicore system with synchronous stop and resume capabilities are described. In one design, an apparatus (e.g., an ASIC) includes first and second processing cores. During debugging, the first or second processing core receives a software command to stop operation and generates a first hardware signal indicating the stop. The other processing core receives the first hardware signal and stops operation. Both processing cores stop at approximately the same time based on the first hardware signal. Thereafter, the first or second processing core receives another software command to resume operation and generates a second hardware signal indicating resumption of operation. The other processing core receives the second hardware signal and resumes operation. Both processing cores resume at approximately the same time based on the second hardware signal. The first and second hardware signals may come from the same or different processing cores.

13 Claims, 5 Drawing Sheets

U.S. PATENT DOCUMENTS

2006/0150007 A1* 7/2006 Gostynski et al. ............ 714/12
2006/0248395 A1* 11/2006 McGowan .................. 714/30
2007/0011656 A1* 1/2007 Kumamoto ................ 717/124

OTHER PUBLICATIONS

Wolf, Computer as Components, 2001, Morgan Kaufmann, pp. 58-60.*

International Preliminary Report on Patentability-PCT/US07/060645, The International Bureau of WIPO, Geneva Switzerland-Jul. 22, 2008.

International Search Report-PCT/US07/060645, International Search Authority-European Patent Office- Jul. 11, 2007.

Written Opinion-PCT/US07/060645, International Search Authority-European Patent Office-Jul. 11, 2007.

* cited by examiner

METHOD AND APPARATUS FOR DEBUGGING A MULTICORE SYSTEM

CLAIM TO PRIORITY

This application claims priority to U.S. Provisional Application No. 60/759,797 filed Jan. 17, 2006.

BACKGROUND

1. Field

The present disclosure relates generally to circuits, and more specifically to a method and apparatus for debugging a multicore system.

2. Background

A multicore system is a system having multiple processing cores. These processing cores may be digital signal processing (DSP) cores, processor cores, and/or some other types of processing units. DSP cores are specialized processors that are designed to execute mathematical computations very rapidly. For example, a DSP core may include one or more multiply-and-accumulate (MAC) units, one or more arithmetic logic units (ALUs), and so on. Processor cores are general-purpose processors that may be programmed to perform various functions.

A multicore system typically goes through a design phase and a debugging phase prior to production. In the design phase, each processing core is designed to meet the requirements for that core. In the debugging phase, the processing cores in the system are tested to find design flaws and bugs, which may be fixed prior to production.

The debugging of a multicore system is challenging for various reasons. First, each processing core may be a complicated system that needs to be debugged using sophisticated debugging tools. Second, the processing cores in the system typically interact with each other. Hence, the debugging of a given processing core may require the other processing cores be properly configured.

Conventionally, multiple debuggers are used to debug the processing cores in a multicore system. Each debugger may be a combination of hardware, firmware, and/or software that controls the operation of an associated processing core to allow for debugging of that core. Each debugger may be operated independently to debug the associated processing core. However, in a multicore system, it is often desirable to coordinate the debugging of these processing cores so that their interactions can be captured.

There is therefore a need in the art for techniques to debug a multicore system.

SUMMARY

Techniques for debugging a multicore system with synchronous stop and synchronous resume capabilities are described herein. In an embodiment, an apparatus (e.g., an ASIC) includes first and second processing cores. During debugging, the first or second processing core receives a software command to stop operation and, in response, generates a first hardware signal indicating the stop of operation. The other processing core receives the first hardware signal and stops operation. Both processing cores stop at approximately the same time based on the first hardware signal. Thereafter, the first or second processing core receives another software command to resume operation and, in response, generates a second hardware signal indicating resumption of operation. The other processing core receives the second hardware signal and resumes operation. Both processing cores resume at approximately the same time based on the second hardware signal. The first and second hardware signals may come from one processing core and may correspond to two edges (the leading and trailing edges) of a single physical hardware signal. Alternatively, the first and second hardware signals may come from different processing cores, so that one processing core can synchronously stop both cores and the other processing core can synchronously resume both cores.

In another embodiment, an apparatus includes at least three processing cores and a cross-switch. The processing cores generate output hardware signals and receive input hardware signals. The output and input hardware signals may be used to synchronously stop, synchronously resume, or both synchronously stop and resume the processing cores during debugging. The cross-switch receives the output hardware signals from the processing cores and provides the input hardware signals for the processing cores. The cross-switch may detect an output hardware signal indicating stop of operation by a processing core during debugging and may provide this output hardware signal as the input hardware signals for all processing cores. The cross-switch may also detect an output hardware signal indicating resumption of operation and may provide this output hardware signal as the input hardware signals for all processing cores. The same or different processing cores may generate the output hardware signal to stop and the output hardware signal to resume.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The debugging techniques described herein may be used for various multicore systems. A multicore system may be implemented within a single integrated circuit (IC) such as an application specific integrated circuit (ASIC), a digital signal processor (DSP), a digital signal processing device (DSPD), a programmable logic device (PLD), a field programmable gate array (FPGA), a processor, a controller, a microprocessor, and so on. For example, a multicore system may be a system-on-a-chip (SoC), and the multiple processing cores may be fabricated on one or more IC dies that may be encapsulated in a single package. A multicore system may also be implemented with multiple ICs. A multicore system may also be used for various electronics devices such as a wireless communication device, a cellular phone, a personal digital assistant (PDA), a consumer electronics device, a laptop computer, and so on.

Figure 1:
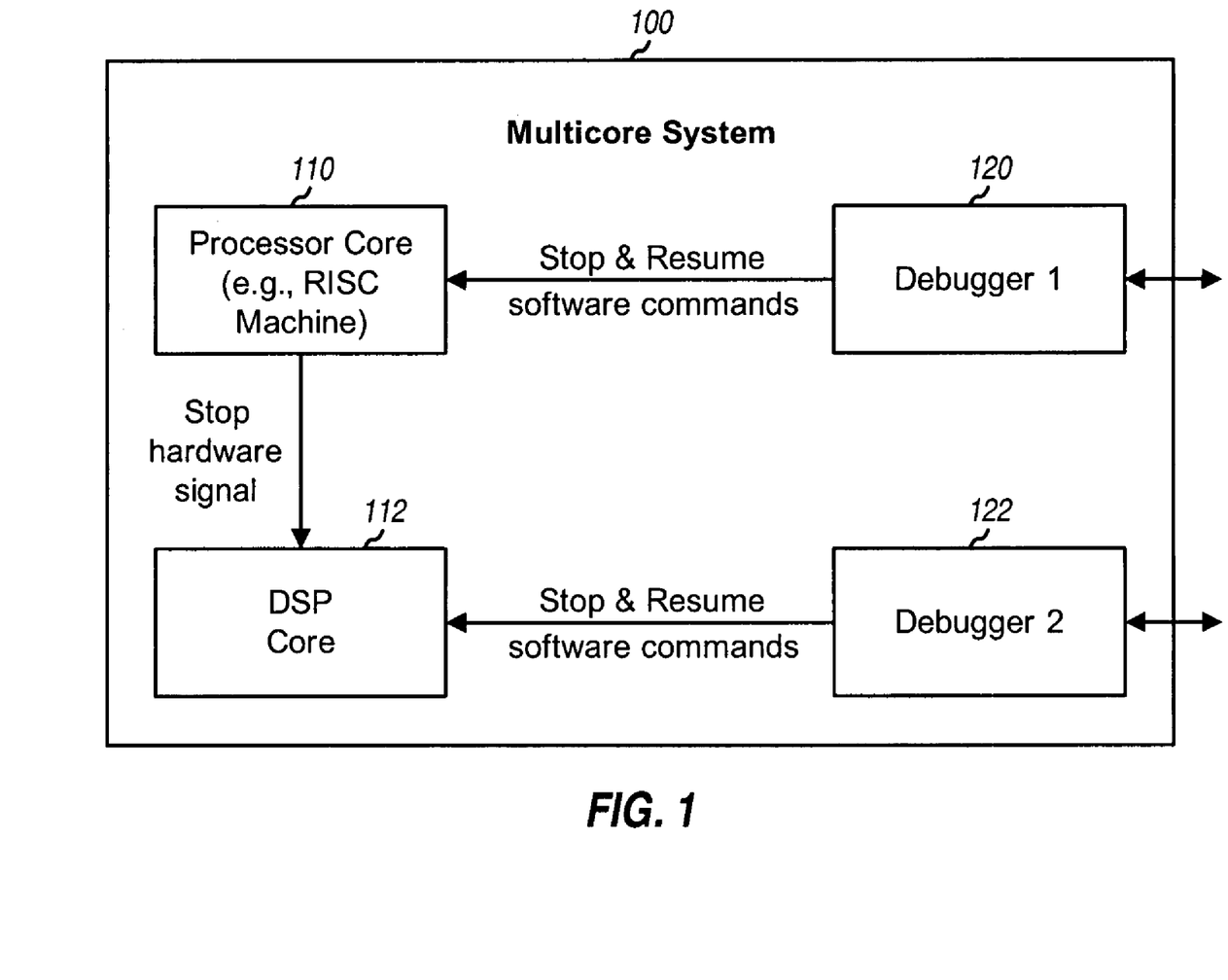
FIG. 1 shows a multicore system with synchronous stop for two processing cores.

FIG. 1 shows a block diagram of an exemplary multicore system 100 that supports synchronous stop for two processing cores during debugging. Multicore system 100 includes a processor core 110 that performs general-purpose processing for ASIC 100 and a DSP core 112 that performs mathematical computations for the ASIC. Processor core 110 may be a reduced instruction set computer (RISC) machine or some other type of processor. A RISC machine is a general-purpose processor that is designed to execute a small set of supported instructions very quickly. In general, processor core 110 and DSP core 112 may be implemented with various designs, as is known in the art. Each processing core executes a sequence of instructions that may be stored in a memory (e.g., a cache) or provided to the core in some other manner.

A debugger 120 is used to debug processor core 110, and a debugger 122 is used to debug DSP core 112. Each debugger may interface, e.g., via JTAG or some other type of interface, with an external host system that directs the operation of that debugger. For example, the external host system may configure the debugger to set breakpoints in a program being executed by the associated processing core, to access resources of the processing core, to suspend/stop and to resume operation for the processing core, and so on. Each debugger may send debug commands to the associated processing core to control the operation of that core during debug. These debug commands may be selected from among a set of software commands or instructions that the processing core can execute. For example, a debug command may set a breakpoint (or may be a Stop software command) that stops the processing core if and when a particular event occurs. A debug command may also be a Resume software command that instructs the processing core to resume operation. Each processing core typically executes the debug commands in the same manner as the instructions for normal operation and is typically not aware that it is operating in a debug mode.

For the example shown in FIG. 1, processor core 110 generates a Stop hardware signal whenever it receives a Stop software command from debugger 120. This Stop hardware signal is provided to DSP core 112 and is used to stop the DSP core whenever the processor core is stopped.

The design shown is FIG. 1 supports synchronous stop in a multicore debug environment. For example, debugger 120 may set a breakpoint on processor core 110, debugger 122 may set a breakpoint on DSP core 112, and whichever breakpoint hits first can stop both processing cores. If the breakpoint on processor core 110 hits first, then processor core 110 asserts its Stop hardware signal, which then stops DSP core 112. Conversely, if the breakpoint on DSP core 112 hits first, then DSP core 112 asserts its Stop hardware signal (not shown in FIG. 1), which is coupled to processor core 110 and stops the processor core (also not shown in FIG. 1). This feature is often called multicore stop. However, the design shown in FIG. 1 does not support graceful resumption of operation from the multicore stop. After debug functions are completed, processing cores 110 and 112 may be resumed by sending separate Resume software commands from debuggers 120 and 122, respectively. However, debuggers 120 and 122 are typically not synchronized and/or the two processing cores may not resume at the same time upon receiving their Resume software commands. In this case, one processing core (e.g., processor core 110) may run for many cycles (e.g., thousands of cycles) before the other processing core (e.g., DSP core 112) resumes operation. Multicore system 100 is then out of sync, which is undesirable.

Figure 2:
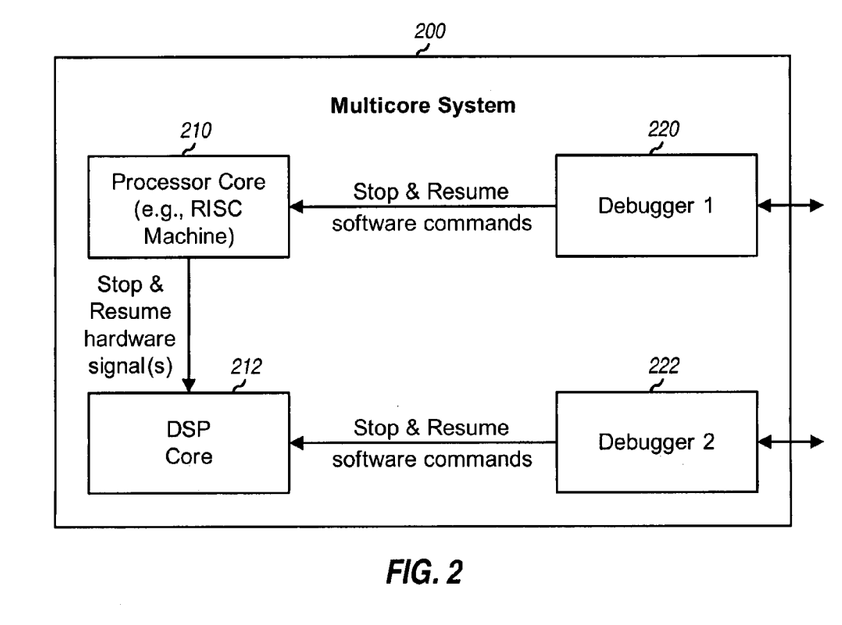
FIG. 2 shows a multicore system with synchronous stop and resume for two processing cores.

FIG. 2 shows a block diagram of an embodiment of a multicore system 200 that supports synchronous stop and resume for two processing cores during debugging. Multicore system 200 may be implemented in an ASIC or some other electronics device. Multicore system 200 includes a processor core 210, a DSP core 212, and debuggers 220 and 222 that operate in similar manners as processor core 110, DSP core 112, and debuggers 120 and 122, respectively, in FIG. 1.

For the embodiment shown in FIG. 2, processor core 210 provides Stop and Resume hardware signal(s) that may be coupled to DSP core 212 and used for synchronous stop and resume, respectively, during multicore debug. Processor core 210 asserts the Stop hardware signal whenever the processor core is stopped by a breakpoint or a Stop software command from debugger 220. Processor core 210 asserts the Resume hardware signal whenever the processor core resumes operation due to a Resume software command from debugger 220. The Stop and Resume hardware signal(s) thus indicate the status of processor core 210.

Figure 3:
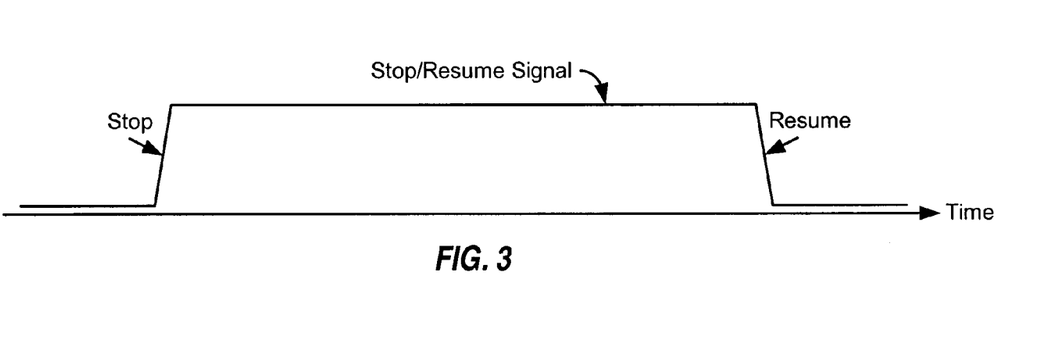
FIG. 3 shows an exemplary Stop/Resume hardware signal.

FIG. 3 shows an embodiment of a Stop/Resume hardware signal that may be used for processor core 210 in FIG. 2. For this embodiment, the leading/rising edge on the Stop/Resume hardware signal indicates stop of operation, and the trailing/falling edge on the Stop/Resume hardware signal indicates resumption of operation. The opposite polarity may also be used so that stoppage of operation may be indicated by a trailing/falling edge and resumption of operation may be indicated by the leading/rising edge.

In another embodiment, separate Stop and Resume hardware signals are used to indicate stop and resume, respectively. In yet another embodiment, stop and resume signals are sent via a hardware interface such as, e.g., a bus, a serial bus interface (SBI), and so on. In yet another embodiment, stop and resume signals are indicated by setting hardware interrupts for the processing cores. The stop and resume signals may also be sent in other manners from one processing core to another processing core without having to rely on the debuggers for these processing cores.

Referring back to FIG. 2, multicore system 200 supports synchronous stop and resume in a multicore debug environment. For example, debugger 220 may set a breakpoint on processor core 210, debugger 222 may set a breakpoint on DSP core 212, and whichever breakpoint hits first can stop both processing cores. After debug functions are completed, both processing cores may be resumed by sending a Resume software command from debugger 220 to processor core 210. Upon receiving this Resume software command, processor core 210 resumes operation and also asserts the Resume hardware signal. DSP core 212 resumes operation upon receiving the Resume hardware signal from processor core 210. By using a faster Resume hardware signal, DSP core 212 is able to resume at the same time as, or within few cycles of, the resume by processor core 210. Processor core 210 and DSP core 212 would then be synchronized coming out of a debug break.

FIG. 2 shows an embodiment in which one processing core (e.g., processor core 210) generates the Stop and Resume hardware signal(s) and the other processing core (e.g., DSP core 212) receives and acts on the Stop and Resume hardware signal(s). For this embodiment, synchronous resume may be achieved by sending a Resume software command to the processing core that generates the Resume hardware signal for the other processing core.

The synchronous stop may be enabled all the time during debug or may be selectively enabled. For example, DSP core 212 may be commanded to act on the Stop hardware signal or to ignore this signal. The synchronous resume may also be enabled all the time during debug or may be selectively enabled. For example, DSP core 212 may be commanded to act on the Resume hardware signal or to ignore this signal.

Figure 4:
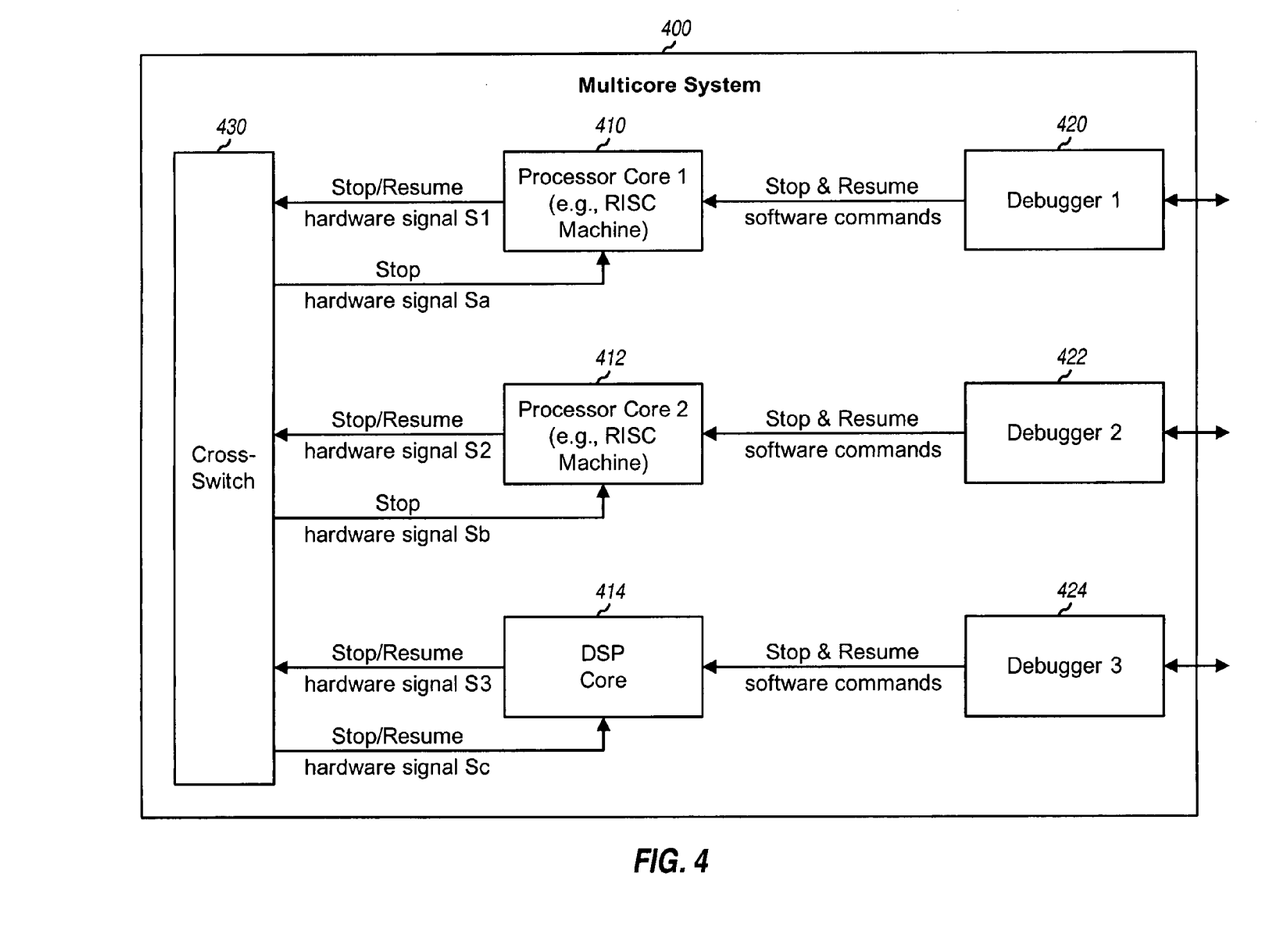
FIG. 4 shows a multicore system with synchronous stop and resume for three processing cores.

FIG. 4 shows a block diagram of an embodiment of a multicore system 400 that supports synchronous stop and resume for three processing cores during debugging. Multicore system 400 may be implemented in an ASIC or some other electronics device. For the embodiment shown in FIG. 4, multicore system 400 includes processor cores 410 and 412, a DSP core 414, a cross-switch 430, and debuggers 420, 422 and 424. Processor cores 410 and 412 may be RISC machines and/or some other types of processor and may be designed to support different applications and functions. Debugger 420 is used to debug processor core 410, debugger 422 is used to debug processor core 412, and debugger 424 is used to debug DSP core 414. Debugger 420 may also be used to debug both processor cores 410 and 412. Each debugger may send debug commands to the associated processing core (s) to control the operation of the associated core(s) during debug.

For the embodiment shown in FIG. 4, processor core 410 generates and provides an output Stop/Resume hardware signal S1 to cross-switch 430 and further receives an input Stop hardware signal Sa from the cross-switch. Processor core 412 generates and provides an output Stop/Resume hardware signal S2 to cross-switch 430 and further receives an input Stop hardware signal Sb from the cross-switch. DSP core 414 generates and provides an output Stop/Resume hardware signal S3 to cross-switch 430 and further receives an input Stop/Resume hardware signal Sc from the cross-switch. Each processing core may assert its output Stop/Resume hardware signal whenever that core is stopped (e.g., by a Stop software command) and may de-assert its output Stop/Resume hardware signal whenever that core is resumed (e.g., by a Resume software command). The output Stop/Resume hardware signal for each processing core may be generated as shown in FIG. 3.

For the embodiment shown in FIG. 4, processor cores 410 and 412 stop when their input Stop hardware signals Sa and Sb, respectively, are asserted. DSP core 414 stops when its input Stop/Resume hardware signal Sc is asserted and resumes when its Stop/Resume hardware signal Sc is de-asserted.

In an embodiment, cross-switch 430 selects one of the three output Stop/Resume hardware signals S1, S2 and S3 and provides the selected hardware signal as the input Stop hardware signals Sa and Sb and the input Stop/Resume hardware signal Sc. For this embodiment, each processing core can synchronously stop the other two processing cores since all three processing cores receive the same Stop hardware signal. For this embodiment, processor cores 410 and 412 can each synchronously resume DSP core 414, which also receives the Resume hardware signal.

In another embodiment, cross-switch 430 provides the output Stop/Resume hardware signal S2 or S3 as the input Stop hardware signal Sa, provides the output Stop/Resume hardware signal S1 or S3 as the input Stop hardware signal Sb, and provides the output Stop/Resume hardware signal S1 or S2 as the input Stop/Resume hardware signal Sc. For this embodiment, processor core 410 may be synchronously stopped by either processor core 412 or DSP core 414, processor core 412 may be synchronously stopped by either processor core 410 or DSP core 414, and DSP core 414 may be synchronously stopped and resumed by either processor core 410 or 412. This embodiment provides flexibility in controlling which processing core(s) may synchronous stop and/or synchronously resume each processing core.

The processing cores and cross-switch may also be operated in other manners, and this is within the scope of the invention. For example, each processing core may be able to synchronously stop the other processing cores, but only processor core 410 may be able to synchronously resume DSP core 414. For this embodiment, processor core 412 and DSP core 414 may provide output Stop hardware signals instead of output Stop/Resume hardware signals.

Figure 5:
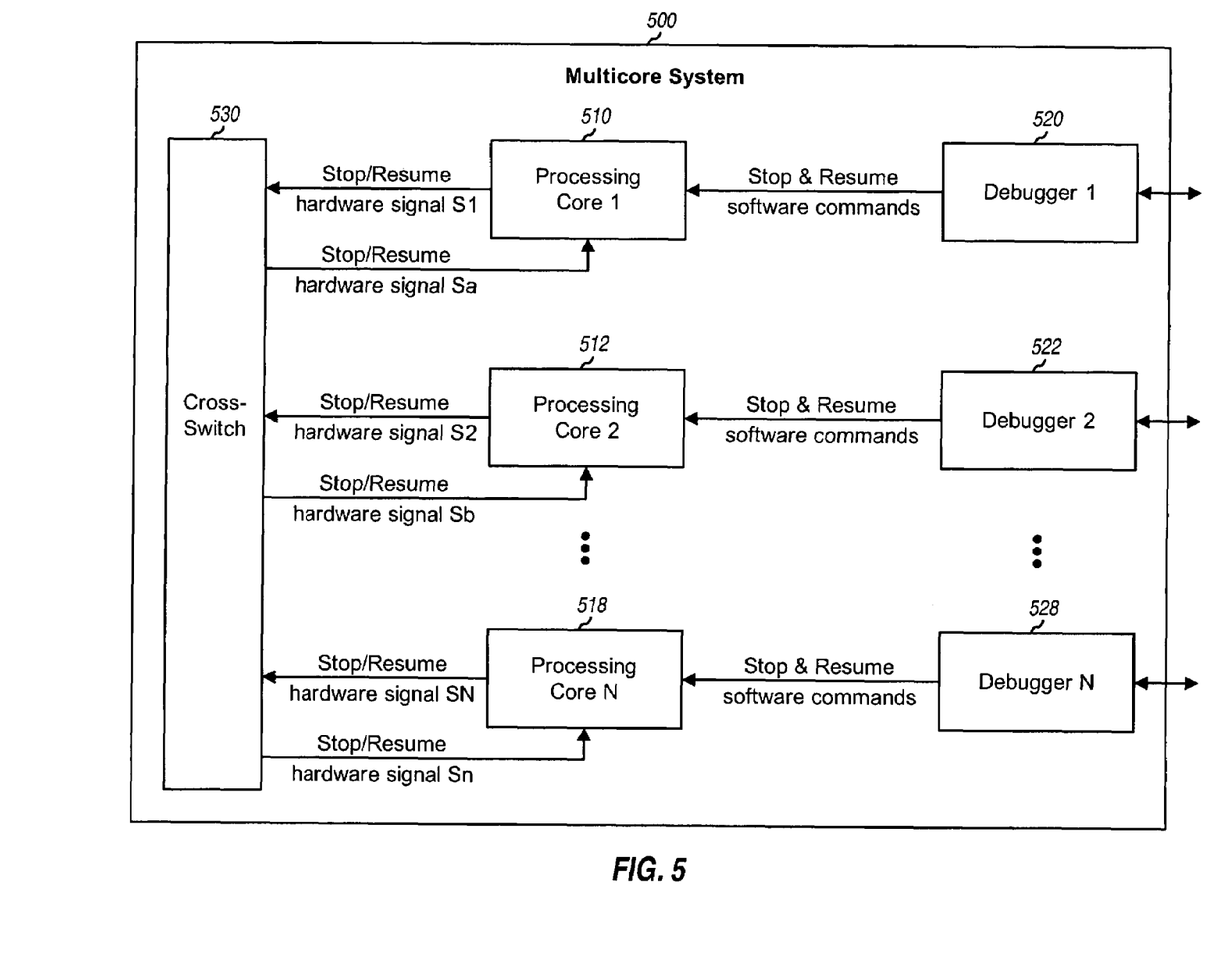
FIG. 5 shows a multicore system with synchronous stop and resume for multiple (N) processing cores.

FIG. 5 shows a block diagram of an embodiment of a multicore system 500 that supports synchronous stop and resume for multiple (N) processing cores 510 through 518 during debugging. Multicore system 500 may be implemented in an ASIC or some other electronics device. Each of processing cores 510 through 518 may be a processor core, a DSP core, or some other type of processing unit. Debuggers 520 through 528 are used to debug processing cores 510 through 518, respectively. A single debugger may also be used to debug more than one processing core. Each debugger may send debug commands to the associated processing core (s) to control the operation of the associated core(s) during debug.

For the embodiment shown in FIG. 5, each of processing cores 510 through 518 generates and provides an output Stop/Resume hardware signal to a cross-switch 530 and further receives an input Stop/Resume hardware signal from the cross-switch. Each processing core may assert its output Stop/Resume hardware signal whenever that core is stopped (e.g., by a Stop software command) and may de-assert its output Stop/Resume hardware signal whenever that core is resumed (e.g., by a Resume software command). A processing core may assert its output Stop/Resume hardware signal by bringing the signal to logic high and may de-assert the output Stop/Resume hardware signal by bringing the signal to logic low, as shown in FIG. 3. In an embodiment, each processing core stops whenever its input Stop/Resume hardware signal is asserted and resumes whenever its input Stop/Resume hardware signal is de-asserted. In an embodiment, each processing core may be programmed to selectively act on or ignore its input Stop/Resume hardware signal.

In an embodiment, cross-switch 530 selects the output Stop/Resume hardware signal from one processing core and provides this selected hardware signal as the input Stop/Resume hardware signals for all N processing cores. For this embodiment, each processing core can synchronously stop or synchronously resume the other processing cores since all processing cores receive the same Stop/Resume hardware signal. Cross-switch 530 may select one output Stop/Resume hardware signal from among the N output Stop/Resume hardware signals S1 through SN in various manners. In one embodiment, cross-switch 530 monitors the N output Stop/Resume hardware signals, selects the output Stop/Resume hardware signal that is asserted first when all processing cores are running, and selects the output Stop/Resume hardware signal that is de-asserted first when all processing cores are stopped. In another embodiment, one processing core may be designated as a master processing core, and cross-switch 530 may select the output Stop/Resume hardware signal from this processing core.

In another embodiment, each processing core Cx (for x=a, b, . . . , n) is associated with a set of processing cores that can stop and/or resume that processing core Cx. For this embodiment, cross-switch 530 selects and provides the output Stop/Resume hardware signal from one of the processing cores in the set as the input Stop/Resume hardware signal for processing core Cx. This embodiment provides flexibility in controlling which processing core(s) may synchronously stop and/or resume processing core Cx. The processing cores and cross-switch may also be operated in other manners, and this is within the scope of the invention.

As noted above, the debugging techniques may be used for multicore systems used in various electronics devices. An exemplary application of the debugging techniques for wireless devices is described below.

Figure 6:
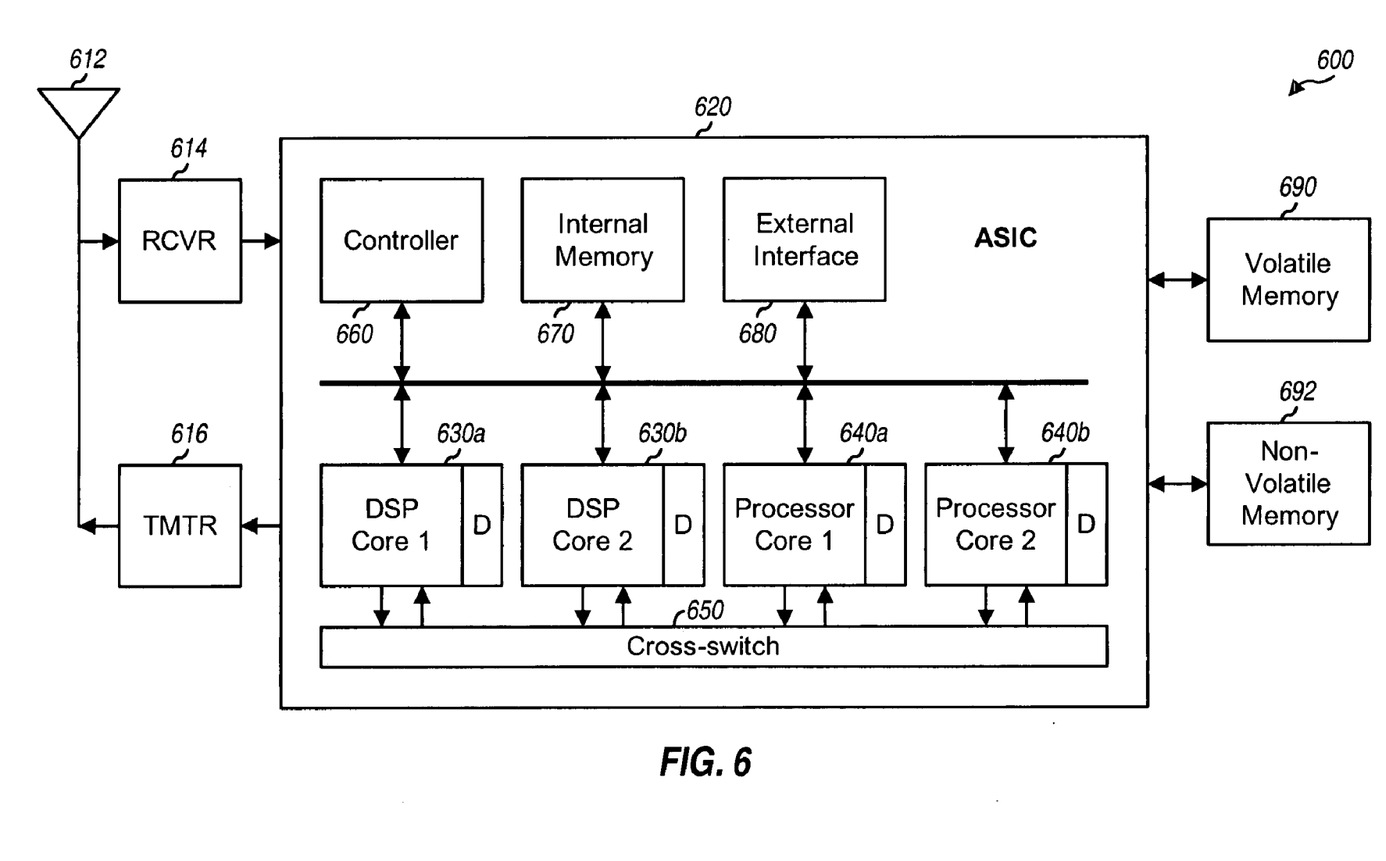
FIG. 6 shows a block diagram of a wireless device.

FIG. 6 shows a block diagram of a wireless device 600, which may be able to monitor and/or communicate with one or more wireless communication systems. On the receive path, an antenna 612 receives signals transmitted by base stations and/or satellites and provides a received signal to a receiver (RCVR) 614. Receiver 614 processes (e.g., filters, amplifies, frequency downconverts, and digitizes) the received signal and provides samples to an ASIC 620 for further processing. On the transmit path, ASIC 620 processes data to be transmitted and provides data chips to a transmitter (TMTR) 616. Transmitter 616 processes (e.g., converts to analog, filters, amplifies, and frequency upconverts) the data chips and generates a modulated signal, which is transmitted via antenna 612.

ASIC 620 includes various processing units that support monitoring and/or communication with one or more communication systems. For the embodiment shown in FIG. 6, ASIC 620 includes DSP cores 630a and 630b, processor cores 640a and 640b, a cross-switch 650, a controller 660, an internal memory 670, and an external interface unit 680. DSP cores 630a and 630b perform processing (e.g., demodulation and decoding) for the receive path, processing (e.g., encoding and modulation) for the transmit path, and/or processing for other applications and functions. Processor cores 640a and 640b support various functions such as video, audio, graphics, gaming, and so on. Each processor core may be a RISC machine, a microprocessor, or some other type of processor. Controller 660 controls the operation of the processing units within ASIC 620. Internal memory 670 stores data and program codes used by the processing units within ASIC 620. External interface unit 680 interfaces with other units external to ASIC 620. In general, ASIC 620 may include fewer, more and/or different processing units than those shown in FIG. 6. The number of processing units and the types of processing units included in ASIC 620 are typically dependent on various factors such as the communication systems, applications, and functions supported by wireless device 600.

For the embodiment shown in FIG. 6, each processing core includes an in-silicon debugger (D) that supports debugging of that core. The debuggers for DSP cores 630a and 630b and processor cores 640a and 640b may communicate with an external host system via JTAG or some other type of interface (not shown in FIG. 6). Cross-switch 650 receives output Stop hardware signals, output Resume hardware signals, and/or output Stop/Resume hardware signals from DSP cores 630a and 630b and processor cores 640a and 640b. Cross-switch 650 provides input Stop hardware signals, input Resume hardware signals, and/or input Stop/Resume hardware signals to the DSP and processor cores, e.g., as described above for FIGS. 4 or 5.

ASIC 620 further couples to a volatile memory 690 and a non-volatile memory 692. Volatile memory 690 provides bulk storage for data and program codes used by ASIC 620. Non-volatile memory 692 provides bulk non-volatile storage.

The debugging techniques described herein may be implemented by various means. For example, these techniques may be implemented in hardware, firmware, software, or a combination thereof. For a hardware implementation, the debugging techniques may be implemented within one or more ASICs, DSPs, DSPDs, PLDs, FPGAs, processors, controllers, micro-controllers, microprocessors, electronic devices, other electronic units designed to perform the functions described herein, or a combination thereof. Certain aspects of the debugging techniques may be implemented with software modules (e.g., procedures, functions, and so on) that perform the functions described herein. The software codes may be stored in a memory (e.g., memory 670, 690 or 692 in FIG. 6) and executed by a processor (e.g., processor core 640a or 640b). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A multicore system comprising:
   a first processor core operative to generate a first hardware signal in response to receiving a resume software command indicating resumption of operation from a stop during debugging of the first processor core and operative to send the first hardware signal to a second processor core, the second processor core coupled to the first processor core and operative in response to receiving the first hardware signal from the first processor core to resume operation from a stop during debugging of the second processor core; whereby the first processor core resumes operation when the first hardware signal is generated, and the second processor core resumes operation within a predetermined number of cycles after receiving the first hardware signal; and
   the first processor core is operative to generate a second hardware signal indicating the stop, whereby the second processor core is operative to stop in response to receiving the second hardware signal; and the second processor core is operative to generate a second hardware signal indicating a stop of the second processor core during debugging of the second processor core, whereby the first processor core is operative to receive the second hardware signal and to stop synchronously with the second processor core upon receiving the second hardware signal.

2. The multicore system of claim 1, wherein the first hardware signal corresponds to a first edge of a physical hardware signal and the second hardware signal corresponds to a second edge of the physical hardware signal.

3. The multicore system of claim 1, wherein at least one of the first and second processor cores is a digital signal processing (DSP) core.

4. The multicore system of claim 1, wherein at least one of the first and second processor cores is a reduced instruction set computer (RISC) machine.

5. The multicore system of claim 1, wherein the first and second processor cores are fabricated on an application specific integrated circuit (ASIC).

6. A multicore system having a first processor core coupled to a second processor core, the system comprising:
   means for generating a first hardware signal from the first processor core during debugging of the first processor core, the first hardware signal sent to a second processor core, the first hardware signal indicating resumption of operation of the first processor core from a stop during the debugging of the first processor core;

means for providing the first hardware signal to the second processor core;

means for resuming operation of the second processor core in response to receiving the first hardware signal from the first processor core;

means for receiving a software command to resume operation of the first processor core, wherein the first hardware signal is generated in response to receiving the software command;

means for generating a second hardware signal at the first processor core, the second hardware signal indicating the stop;

means for receiving the second hardware signal, wherein the second hardware signal is sent from the first processor core to the second processor core;

means for stopping operation of the second processor core in response to receiving the second hardware signal at the second processor core;

means for generating a second hardware signal at the second processor core the second hardware signal indicating the stop;

means for sending the second hardware signal from the second processor core to the first processor core;

means for receiving the second hardware signal at the first processor core; and means for stopping operating of the first processor core in response to receiving the second hardware signal.

7. A method comprising:

generating a first hardware signal at a first processor core of an integrated circuit, the first hardware signal indicating resumption of operation from a stop during debugging of the first processor core;

sending the first hardware signal from the first processor core to a second processor core;

receiving the first hardware signal at the second processor core, the first hardware signal sent from the first processor core;

resuming operation of the second processor core in response to receiving the first hardware signal;

receiving a first software command to resume operation of the first processor core, wherein the first hardware signal is generated in response to receiving the first software command;

generating a second hardware signal at the first processor core indicating a stop;

receiving the second hardware signal at the second processor core;

stopping operation of the second processor core in response to receiving the second hardware signal; and receiving a second software command at the first processor core to stop operation of the first processor core, wherein the second hardware signal is generated in response to receiving the second software command.

8. A multicore processor comprising:

a plurality of processor cores including a first processor core, a second processor core, and a third processor core, wherein the first processor core is operative to generate a first hardware signal indicating a stop of operation during debugging of the first processor core, the second processor core, and the third processor core; wherein the first processor core is operative to stop when the first hardware signal is generated, and wherein each of the second processor core and the third processor core is operative to stop upon receiving the first hardware signal;

a cross-switch electrically coupled to the plurality of processor cores, the cross-switch operative to receive the first hardware signal from the first processor core and to provide the first hardware signal to the second processor core and to the third processor core during the debugging of the first processor core, the second processor core, and the third processor core;

the first processor core is operative to generate a second hardware signal indicating resumption of operation, and wherein the cross-switch is operative to receive the second hardware signal from the first processor core and to provide the second hardware signal to the second processor core and to the third processor core; and the second processor core is operative to generate a second hardware signal indicating resumption of operation, and wherein the cross-switch is operative to provide the second hardware signal from the second processor core to then first processor core and to the third processor core.

9. The multicore processor of claim 8, wherein the first hardware signal corresponds to a first edge of a physical hardware signal and the second hardware signal corresponds to a second edge of the physical hardware signal.

10. The multicore processor of claim 8, wherein the plurality of processor cores include at least one digital signal processing (DSP) core and at least one reduced instruction set computer (RISC) machine.

11. A multicore processor comprising:

a first processor core operative to generate a first signal during debugging of the first processor core, the first processor core further operative to receive a second signal and a third signal, wherein the first signal comprises one of a first stop command to stop operation, a first resume command to resume operation, and a first stop and resume command to stop operation and subsequently resume operation after a predetermined time period has elapsed;

a second processor core operative to generate the second signal during debugging of the second processor core, the second processor core further operative to receive the first signal and the third signal, wherein the second signal comprises one of a second stop command to stop operation and a second resume command to resume operation;

a third processor core operative to generate the third signal during debugging of the third processor core, the third processor core further operative to receive the first signal and the second signal; and a cross-switch electrically coupled to the first processor core, the second processor and the third processor core, the cross-switch operative to receive the first signal and to provide the first signal to the second processor core and to the third processor core concurrently;

wherein the first processor core is operative to stop operation of the first processor core upon receiving the second signal or the third signal, the second processor core is operative to stop operation of the second processor core upon receiving the first signal or the third signal, and the third processor core is operative to stop operation of the third processor core upon receiving the first signal or the second signal;

wherein the second processor core is operative to stop operation of the second processor core and subsequently resume operation of the second processor core after the predetermined time period has elapsed in response to receiving the first signal, and the third processor core is operative to stop operation of the third processor core and resume operation of the third processor core after the predetermined time period has elapsed in response to receiving the first signal;

wherein the first stop command comprises a command to stop operation of the second processor core and the third processor core synchronously with the first processor core; and the first resume command comprises a command to resume operation of the second processor core and the third processor core synchronously with the first processor core.

12. The multicore processor of claim 11, wherein the third processor core comprises a digital signal processing (DSP) core and at least one of the first processor core and the second processor core comprises a reduced instruction set computer (RISC) machine.

13. The multicore system of claim 11, wherein the multicore system is embedded in an application specific integrated circuit (ASIC).

\* \* \* \* \*